United States Patent [19]
Haase

[11] Patent Number: 5,705,072
[45] Date of Patent: Jan. 6, 1998

US005705072A

[54] BIOTREATMENT OF WASTEWATER FROM HYDROCARBON PROCESSING UNITS

[76] Inventor: Richard Alan Haase, 3027 W. Autumn Run Cir., SugarLand, Tex. 77479

[21] Appl. No.: 794,532

[22] Filed: Feb. 3, 1997

[51] Int. Cl.$^6$ .................................................. C02F 3/34
[52] U.S. Cl. .................. 210/605; 210/611; 210/630; 210/631; 210/903
[58] Field of Search .................. 210/605, 610, 210/611, 620, 630, 631, 903

[56] References Cited

U.S. PATENT DOCUMENTS

| | | | |
|---|---|---|---|
| 4,271,013 | 6/1981 | Bhattacharyya | 210/631 |
| 4,290,891 | 9/1981 | Ackerman | 210/611 |
| 4,384,956 | 5/1983 | Mulder | 210/603 |
| 4,537,682 | 8/1985 | Wong-Chong | 210/611 |
| 4,737,289 | 4/1988 | Castaldi | 210/611 |
| 5,169,532 | 12/1992 | Whitlock | 210/611 |
| 5,269,929 | 12/1993 | Sublette et al. | 210/610 |
| 5,346,620 | 9/1994 | Hendrix et al. | 210/605 |
| 5,366,633 | 11/1994 | Buisman | 210/614 |
| 5,403,487 | 4/1995 | Lodaya | 210/610 |
| 5,449,460 | 9/1995 | Buisman | 210/605 |
| 5,474,682 | 12/1995 | Buisman | 210/610 |
| 5,480,550 | 1/1996 | Sublette | 210/611 |

*Primary Examiner*—Thomas G. Wyse
*Attorney, Agent, or Firm*—Maryam Bani-Jamali

[57] ABSTRACT

This invention provides a process for the biotreatment of effluent from waste gas scrubbing systems of hydrocarbon processing facilities and for the biotreatment of sulfide- and ammonia-containing wastewater streams from other sources. Sulfides are minimized by bacteria cultures, particularly Thiobacillus. COD, TKN and BOD are concurrently minimized by co-cultures of the bacteria with various heterotrophs. In a version of the process, the co-cultures of the bacteria with various heterotrophs are also capable of performing nitrification, without application of nitrifiers. Acclimation of the heterotrophs to the species to be removed is accomplished by biological acclimation and enrichment reactors which reduce mycell toxicity to the heterotrophs. To control pH of the heterotrophic reaction with sulfides, magnesium oxide (MgO) and caustic are used separately or in combination. With adequate removal of the COD, TKN and BOD, nitrification and removal of ammonia can be accomplished by nitrifying bacteria cultures, particularly nitrosomonas and nitrobacters. Enrichment of the nitrosomonas and nitrobacters is accomplished by using a biological enrichment reactor. To control pH and provide a carbon source for the nitrosomonas and nitrobacters, a combination of magnesium oxide and sodium bicarbonate is utilized.

35 Claims, No Drawings

BIOTREATMENT OF WASTEWATER FROM HYDROCARBON PROCESSING UNITS

BACKGROUND OF THE INVENTION

1. Field of the Invention

This invention relates to a process for biologically treating effluent water streams from waste gas systems of hydrocarbon processing units and biologically treating sulfide- and ammonia-containing wastewater streams from other sources, to remove or significantly reduce chemical oxygen demand (COD), sulfides, biological oxygen demand (BOD), ammonia and total Kjeldahl nitrogen (TKN).

2. Description of the Prior Art

Short-chain hydrocarbons and elemental carbon black are produced by high-temperature hydrocarbon processing units (such as furnaces) upon incineration of hydrocarbon products. Carbon black is utilized world wide in preparation of "black" products, comprising plastic products that require ultraviolet light stability, pigments for plastic products, for fabric products and for paint products, to name a few, and inks. A byproduct of the incineration of hydrocarbon products is the waste gases in which many removed products are either oxidized or carried off. These gases may contain various forms of sulfur, nitrogen and carbon containing compounds that can be harmful to the environment. The potential environmental consequences of the release of these gases would probably soon result in regulations on removal of carbon and of the sulfur, nitrogen and carbon containing compounds from these waste gas streams.

The technology that is typically utilized to remove sulfur, nitrogen and carbon containing compounds from a gas stream is a waste gas scrubbing system. The waste gas scrubbing system of a high-temperature carbon processing plant is utilized to remove waste gas products that are released during high-temperature incineration of feed hydrocarbon of the plant. To increase the efficiency of the waste gas scrubbing system, chemicals such as caustic (sodium hydroxide) and hydrogen peroxide could be used to augment water in the waste gas scrubbing system. As a result, water effluent from the waste gas scrubbing system contains many sulfur, nitrogen and carbon containing compounds, as well as carbon, that were present in the waste gas from the hydrocarbon incineration process. Water streams exiting the waste gas scrubbing system are laden with many difficult to treat organic and inorganic wastes, with a COD concentration ranging from about 100 ppm to about 10,000 ppm, a sulfide concentration of up to approximately 500 ppm, a TKN concentration of up to about 1,000 ppm and an ammonia concentration of up to approximately 500 ppm. The presence of sulfur compounds, such as sulfides, in wastewater has adverse consequences comprising: high COD resulting in oxygen depletion in the receiving water after discharge of the wastewater and, thus, leading to high environmental pollution and/or levies, toxic effects and serious stench. The odor is related to the chemical characteristics of sulfides. Concentration of certain sulfidic species above and below their odor threshold are known toxins. Further, sulfides at or above 5 ppm significantly inhibit or stop nitrification in wastewater systems as sulfides are toxic to nitrifying bacteria.

Recycling of the wastewater streams of the waste gas scrubbing system decreases the efficiency of the scrubbing system and presents a volatile, toxic water stream in the plant. Currently, most spent-sulfidic caustics are either sent off-site to commercial operations for recovery or reuse or for disposal by deep-well injection. Release of the sulfur-containing effluent water streams of the waste gas scrubbing systems into the environment endangers aquatic life. Potential regulatory changes would result in more stringent controls and increased cost for off-site management, transportation and disposal costs of the wastewater streams, necessitating less-expensive, on-site treatment options.

In determining economical and efficient solutions for removal of sulfur-containing compounds, several factors should be considered. Generally, two types of methods are available for the removal of sulfur-containing compounds: physicochemical treatments and biological treatments. Physicochemical treatments (including electrodialysis and reverse osmosis) are expensive and produce large streams of wastewater. In biological treatment of the wastewater, lack of sufficient wastewater treatment capacity, as well as odors and toxicity, in the plant act as prohibiting factors.

Processes for the treatment of wastewater for the removal of sulfides, BOD, COD, TKN and ammonia utilizing bacteria are generally known. The wastewater could be treated under aerobic and anaerobic conditions. To remove BOD, COD, TKN and/or ammonia, many municipal and industrial facilities apply bacteria either in a single-pass aerated or anoxic treatment system utilizing either ranks, ponds or film reactors or in a multi-step process performed in an aerated or anoxic activated sludge system.

Several patents have been issued, mostly in the past decade, that are focused on biotreatment of waste waters.

Sublette, U.S. Pat. No. 5,480,550, issued on Jan. 2, 1995, patents a biotreatment process of caustic waste streams containing inorganic sulfides to effect neutralization of the caustic and oxidation of sulfides to sulfate via a sulfide-oxidizing bacterium from the genus Thiobacillus. Being premised on the treatment of caustic waste streams that only contain inorganic sulfides, this process considers neither wastewater of lower pH, nor the removal of organic sulfides or streams containing both organic and inorganic sulfides that may inhibit nitrification, nor the heterotrophic balance necessary to reduce COD and TKN to a level where nitrification can occur, nor the reduction in sulfides so that nitrification can occur.

Buisman, U.S. Pat. No. 5,474,682, registered on Dec. 12, 1995, discusses a method for removing sulfur compounds from water by anaerobic treatment of the water with sulfur- and/or sulfate-reducing bacteria mostly at a temperature of above 45° C. This process fails to take into account COD cleansing or nitrification of the wastewater once the sulfur compounds are removed.

Buisman, U.S. Pat. No. 5,449,460, issued on Sep. 12, 1995 (a division of Buisman, U.S. Pat. No. 5,366,633, registered on Nov. 22, 1994), patents a process for treatment of water containing sulfur compounds. The sulfur compounds are reduced in an aerobic reactor and, using sludge-containing aerobic bacteria, the sulfide is oxidized to elemental sulfur which is then separated and removed. The need for an aerobic treatment decreases the cost-efficiency of the process. This process fails to take into account COD cleansing or nitrification of the wastewater once the sulfur compounds are removed.

Wong-Chong, U.S. Pat. No. 4,537,682, registered on Aug. 27, 1985, patents a process for biotreatment of wastewater containing ammonia, and possibly other contaminants comprising cyanides, thiocyanates, sulfides and/or organics, utilizing an activated sludge system, according to which nitrifying organisms convert ammonia to nitrite and then to nitrate, after which facultative microorganisms convert nitrate and/or nitrite to elemental nitrogen. Optionally, other microorganisms can be used to convert cyanides and thiocyanate to ammonia and sulfide to sulfate. However, sulfides and/or amines are not biologically removed and over 100 days of acclimation are needed for generation of ammonia from TKN species.

The above-listed patents and many other similar inventions have been developed, some of which still exist in the market. Although many different issues have been solved by previously- and presently-existing biotreatment processes, no biotreatment process has strived towards removal of potentially high concentrations of COD, sulfides, TKN and/or ammonia contained in effluent water streams from the waste gas scrubbing system of hydrocarbon incineration plants or contained in sulfide- and ammonia-carrying wastewater streams of other sources. (For the present invention, all statements that refer to the process of treatment of effluent water streams from the waste gas scrubbing system of hydrocarbon incineration plants also apply to the process of treatment of other sulfide- and ammonia-containing wastewater streams of other sources.)

SUMMARY OF THE INVENTION

A primary object of the invention is to devise an economically-feasible process for treating wastewater that contains BOD, COD, TKN, sulfides and/or ammonia, such that the treated wastewater could be discharged into the environment, without having illegal negative effects on the environment, or could be reused.

Another object of the invention is to devise an economically-feasible process for treating wastewater, containing BOD, COD, TKN, sulfides and/or ammonia, to an extent that the treated wastewater could be recycled back to the waste gas scrubbing system.

Yet another object of this invention is to devise a process for treating wastewater that contains BOD, COD, TKN, sulfides and/or ammonia by using previously-treated wastewater, such that all treated wastewater could be discharged into the environment, without having illegal negative effects on the environment, or could be reused.

An additional object of this invention is to minimize equipment investment and operating capital that are needed in a process for treatment of wastewater from hydrocarbon incinerators.

A final object of this invention is to provide a process for treating wastewater from hydrocarbon incinerators that conforms to the Clean Water Act of 1974.

Additional objects and advantages of the invention will be set forth in part in a detailed description which follows, and in part will be obvious from the description, or may be learned by practice of the invention.

The present invention consists of a process for the biological treatment of wastewater exiting the waste gas scrubbing system of high-temperature hydrocarbon incinerators, as well as for the biological treatment of sulfide- and ammonia-containing wastewater from other sources. This invention uses bacteria to remove or significantly reduce the COD, TKN, sulfides and ammonia from the effluent of the waste gas scrubbing system. (To simplify the description of the present invention, "removal" would implement removal or significant reduction.) Sulfides, COD, TKN and BOD are removed by a co-culture of various heterotrophs and Thiobacillus, with the Thiobacillus being cultured on sulfides. Upon removal of COD, TKN and BOD, nitrification is accomplished with the addition of nitrosomonas and nitrobacters. During nitrification, removal of sulfides continues. In another embodiment, nitrification is accomplished in the absence of nitrifiers by co-cultures of various heterotrophs with the bacteria.

It is to be understood that the descriptions of this invention are exemplary and explanatory, but are not restrictive, of the invention. Other objects and advantages of this invention will become apparent from the following specification and from any accompanying charts, tables, examples and drawings.

DETAILED DESCRIPTION OF THE PREFERRED EMBODIMENT

Preferred embodiments of the present invention are illustrated in any charts, tables, examples and drawings that are included.

The present invention provides a process for biotreating wastewater containing various forms of sulfides, sulfites, sulfates, BOD, COD and TKN, as well as ammonia. BOD, COD, TKN and sulfides are removed from the waste gas scrubbing system effluent water utilizing a mixture of heterotrophs and Thiobacillus. Sulfides are removed with the strain Thiobacillus. COD, TKN and BOD are concurrently removed with the sulfides by co-culture of the Thiobacillus with various heterotrophs. This process can also remove less biologically difficult streams from the same facility that contain sulfides, BOD, COD, TKN and ammonia. Acclimation of the heterotrophs to the species to be removed is accomplished with a biological acclimation and enrichment reactor. The reactors reduce mycell toxicity to the heterotrophs so that the heterotrophs perform more efficiently and effectively. To control pH of the heterotrophic reaction with inorganic and organic sulfides, magnesium oxide (MgO) is utilized along with caustic.

With adequate removal of the sulfides, COD, TKN and BOD, nitrification and removal of ammonia can be accomplished by added nitrosomonas and nitrobacters. Enrichment of the nitrosomonas and nitrobacters is accomplished by using a biological enrichment reactor. The reactors increase the population size of the nitrosomonas and nitrobacters, as well as the population effectiveness of the nitrosomonas and nitrobacters. To control pH and provide a carbon source for the nitrosomonas and nitrobacters, a combination of magnesium oxide and sodium bicarbonate is utilized. To provide a source of soluble O-Phosphate, mono-calcium phosphate is utilized (although any form of phosphate that provides soluble phosphates in water can be used). Ammonia is available to the heterotrophs and Thiobacillus by the breakdown of TKN. If TKN is not available, ammonia can be added chemically by various means.

In another version of the invention, nitrification is achieved by the co-cultures of bacteria with various heterotrophs, in the absence of nitrifiers. The co-cultures of bacteria with the various heterotrophs are capable of minimizing COD, BOD, TKN and ammonia content of the wastewater and of enhancing nitrification.

Sulfide can be biologically removed by using phototropic sulfur bacteria (resulting in production of sulfur), as well as by using denitrifying bacteria. Sulfide can also be converted to sulfate by oxygen-consuming bacteria in activated sludge (i.e. aerobic conversion). In an aerobic reaction, in order to remove sulfides from the wastewater, the sulfide is converted to sulfate:

Many species of the genus Thiobacillus are suitable sulfur-oxidizing bacteria for converting sulfide to sulfate in the above reaction. Aerobic conversion of sulfide proceeds much faster than phototropic conversion which is anaerobic and which requires light supply in a reactor. However, sulfide adversely effects the purification efficiency and sludge retention during aerobic purification of wastewater based on a process wherein activated sludge is used. Presence of sulfide-oxidizing, filamentous bacteria in the treatment plants is one factor in the adverse effects of sulfides. The filamentous bacteria hamper an efficient settlement of sludge, causing washing out of the sludge. As a result, the activity of the waste treatment plant and, thus, the purification performance of the plant diminish. The decrease in efficiency of sludge settlement causes an increase in the COD load and in the BOD load and, therefore, an increase of levies.

The present invention introduces improved microorganism cultures (referred to hereafter as "CV-S" cultures) that are designed for removing, while using sulfur compounds as sources of energy, sulfides (but not sulfates) from sulfide-containing hydrocarbon waste discharges. The CV-S cultures comprise a unique combination of presently-marketed "S" cultures, developed by POLYBAC Corporation, that are raised on thio-sulfides. An inoculation and augmentation program utilizes a special blend of the "S" cultures and heterotrophs to permit nitrification. In a most preferred embodiment, the CV-S cultures comprise approximately 40% heterotrophs and approximately 60% "S" cultures (with the CV-S cultures being presently referred to in the market as Bio "S"). However, the "S" cultures can be added to the system in a blend combination of about 20% to about 100% "S". The CV-S cultures are introduced into the wastewaters via an enricher reactor or directly to the system. As a preferred version, the enricher reactor reduces required augmentation by about 60% to about 80%.

The CV-S cultures, which are blended with heterotrophic cultures, are raised on thio-sulfates and have the ability to grow under reduced oxygen conditions and at lower than neutral pH ranges. However, the CV-S cultures do not generate pH levels that are as low as the pH levels generated by sulfate-reducing bacteria (SRB). Despite being an obligate aerobe, the CV-S cultures are able to flourish at interfaces of anaerobic environments where CV-S cultures obtain energy by absorbing and detoxifying hydrogen sulfide ($H_2S$) and sulfur dioxide ($SO_2$). Sulfides are combined with low levels of available oxygen to generate neutral products (sulfur and water), along with metabolic energy for the CV-S cultures. The CV-S cultures offer the advantage of oxidizing sulfur compounds to elemental sulfur under aerobic, accompanied by anoxic, conditions:

Biological mass containing (S+ $H_2O$)

A major advantage of the CV-S cultures used in the present invention is that the resulting sulfur is not further oxidized to sulfuric acid.

For treating the ammonia content of wastewaters, certain aerobic autotrophic microorganisms can oxidize ammonia to nitrite which can be further microbially oxidized to nitrate. Said reaction sequence is known as nitrification. Nitrification reduces the total organic carbon content and the nitrogen content of the wastewater. Ammonia is removed from the wastewater by bacterial oxidation of ammonia to nitrate ($NO_3$), using bacteria that metabolize nitrogen. Nitrification is carried out by a limited number of bacterial species and under restricted conditions including a narrow range of pH and temperature and dissolved oxygen levels, along with reduced COD and BOD levels. Atmospheric oxygen is used as the oxidizing agent. Nitrifying bacteria grow slowly and nitrogen oxidation is energy poor in relation to carbon oxidation. In addition, nitrification is inhibited by the presence of a large number of compounds, including ammonium sulfides and nitrite ion ($NO_2$). Also, nitrifying bacteria subsist only under aerobic conditions and require inorganic carbon ($CO_3^-$ or $HCO_2$) for growth. The sequence of intermediates is:

Nitrifying microorganisms, such as nitrosomonas, aerobically convert ammonia in the wastewater to nitrite:

$$NO_2^- + 2H^+ + H_2O)$$

Once the ammonia has been converted into nitrite, nitrifying microorganisms such as nitrobacters aerobically act on and convert the nitrite into nitrate:

Aerobic conditions are dissolved oxygen levels of at least about 0.5 milligrams of oxygen per liter of wastewater (as is known in the art).

Successful nitrification is indicated by $N-NH_3$ reduced-to-goal levels for water discharge, typically about 3 ppm to 30 ppm. Dissolved oxygen levels should be in excess of approximately 0.5 mg/l and free ammonia in solution should be held below about 10 to 250 mg/l for the reaction of nitrosomonas and nitrobacters. Levels of free nitrous acid in solution should be between about 0.2 mg/l and 2.8 mg/l for the reaction of nitrobacters to occur.

It may be worthwhile to note that the term "ammonia" is used in the art to describe "ammonia as a contaminant in industrial wastewater". "Ammonia" refers, in this art, to the $NH_4^+$ ion that exists in aqueous solution and that is acted on microbially, with the following equilibrium existing in the aqueous solution:

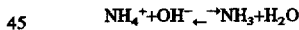

A parameter that needs to be controlled is the biological oxygen demand. A relatively small amount of BOD is required for the reduction of nitrification products, that result from ammonia in the wastewater, to free nitrogen. The BOD levels must be sufficiently low so that microbial conversion of ammonia to nitrite and/or nitrate occurs.

Any excess biological oxygen demand, which may be present in the wastewater, can be oxidized by heterotrophic microorganisms and can be converted into carbon dioxide and water:

a BOD +

Supplemental BOD can be provided by affirmatively adding appropriate quantities of essentially any water-soluble organic material at concentrations of up to 20 ppm.

Due to the existence of numerous reactions and steps in removing COD, BOD, TKN, sulfides and ammonium, the biotreatment process should be controlled as much as possible. Regular measurements of various factors would be a requirement in achieving the desired results. A controlling factor that could be measured through the biotreatment process is the pH and its range of variation. The preferred reaction kinetics are provided by assuring that the pH lies within a range hospitable to the growth and reaction of the involved microorganisms and that the microorganism activity is preserved at a sufficiently high level that significant amounts of contaminant species do not build up and leave the wastewater unreacted.

Another factor to be regularly checked is concentration of the free ammonia. The free ammonia concentration levels in wastewater are thermodynamically determined by a combination of total ammonia concentration ($NH_4^+$ and $NH_3$) in the sludge, sludge pH and sludge temperature. By controlling the level of nitrous acid by using pH and temperature, inhibition of nitrobacters and nitrosomonas can be avoided.

Measurements of the levels of caustic and magnesium oxides by pH are useful as well. The level of pH can be controlled by addition of caustic, magnesium oxide or a combination of caustic and magnesium oxide. In addition, a combination of magnesium oxide and sodium bicarbonate can be used to control the level of pH of and to provide a carbon source for the nitrosomonas and nitrobacters.

Temperature is another factor that is important in controlling the reactions. The reaction kinetics can be controlled by setting the temperature within a range that is hospitable to the growth and reaction of all involved microorganisms. Nitrobacter microorganisms are deleteriously affected by temperatures in excess of about 27° C. Meanwhile, within the noninhibitory range of temperatures, reaction rate decreases with decreasing temperatures. The preferred temperature range of reaction is between about 5° C. and 35° C., with a most preferred range being between about 15° C. and 25° C. A single reactor is used at one stage and in one step for biological enrichment of, by increasing the population size and population effectiveness of, nitrosomonas and nitrobacters.

Normally, the changes in the proportions of different groups of microorganisms can be estimated through routine sampling and chemical analysis of both wastewater feed and effluent, and measurements of wastewater feed flow rates, pH and dissolved oxygen uptake rates of the system mixed liquor. Typical chemical analyses of the wastewater feed and effluent includes alkalinity, COD and BOD, as well as contents of ammonia, nitrate, nitrite, ortho-phosphate, cyanide, sulfide, thiocyanate and specific organics in the solution. The present invention uses a biological acclimation and enrichment reactor to accomplish acclimation of the heterotrophs. To feed the heterotrophs, an additive comprising ammonia is provided to the biological acclimation and enrichment reactor. As a result, ammonia can be treated without using a prior physical or chemical treatment of the raw wastewater, as is conventionally done, to reduce contaminant levels. The acclimation ability and time will be dependent upon the initial size of the individual microorganisms and those parameters which control microorganism growth and reaction rates (such as pH, temperature and dissolved oxygen levels).

An efficient management of an activated sludge system requires: food (waste) to microbiological (F/M) ratio measurements, management of sludge age, weekly microbiological measurements, dissolved oxygen level (DO) determinations and measurements of m-alkalinity, ammonia and phosphate levels.

The process of this invention is illustrated in even greater detail by reference to the following examples which are provided as being merely exemplary and are not to be construed as limiting the scope of this invention. In the following tests, adopted microorgansims were used to try and improve the biotreatment process. The adopted microorganisms were added to the biotreatment system daily, while several different parameters were monitored throughout the process. The monitored parameters were pH, BOD, COD, DO, m-alkalinity, ammonia-nitrogen level, orthophosphate level, nitrate level, nitrite level and temperature. Several chemicals that played an important role in the process were a high-phosphate additive and a pH stabilizer.

The high-phosphate additive is primarily used in aeration basins and wastewater lagoons to increase the soluble orthophosphate in aeration basins and wastewater lagoons. The high-phosphate additive comprises:

| | |
|---|---|
| $Ca(H_2PO_4)_2.H_2O$ | 84%–86% |
| Iron and aluminum oxides | 4%–5% |
| Free acid | 2%–4% |
| Moisture | 1%–3% |
| Magnesium compounds | 0.7%–1% |

The additive has a bulk density of 70 lb./ft$^3$ and a pH (1% slurry) of 3.1 to 3.2 and is corrosive to iron, aluminum, copper and brass, thus requiring feed systems made of polyvinyl chloride (PVC), polyethylene or polypropylene. The additive goes into aqueous solution upon contact with water and forms phosphoric acid upon contact with water. Due to the slow release of the additive from the bottom of the pond, the additive provides phosphate protection for days after being added to the wastewater.

Meanwhile, a pH stabilizer is used to control the pH of the wastewater. The pH stabilizer comprises:

| | |
|---|---|
| MgO | 93.00% |
| $R_5O_3$ | 1.50% |
| CaO | 2.50% |
| Insol | 3.00% | with $R_5O_3$ comprising calcium and magnesium silicates, aluminates and ferrites. The pH stabilizer has a density of 65 lb./ft$^3$ and is reactive with strong acids or other electron acceptors. The pH stabilizer hydrolyzes to magnesium hydroxide upon contact with water and is self-buffering to a maximum pH of 9.5. At a pH of 10, the pH stabilizer precipitates out of solution, eliminating further increases in pH. A ratio of over 20 weight percent of pH stabilizer to water would lead to water boiling due to the hydrolysis reaction.

EXAMPLE 1

In some original tests on applications of the present invention, optimizing the nitrification of the biotreatment process was the goal. The result of a test run for enhancing nitrification as the major goal of the biotreatment process follows:

Test 1

The test was run for 45 days. A gel of nitrifying microorganisms (or bacteria), which is a blend of nitrosomonas and nitrobacters, was used in an aerobic biological treatment. On day 1, the nitrifying microorganisms were placed in the bio-reactor tote to undergo a 36-hour growth cycle. The nitrifying microorganisms were grown for 36 hours and placed into the borrow pit on day 3. The nitrifying microorganisms were introduced into pond 1 and pond 2 from the bio-reactors. At start-up, the borrow pit contained 15 million gallons of wastewater and an ammonia level of 90 ppm. Pond 1 contained 400,000 gallons and pond 2 contained 600,000 gallons of wastewater.

A nitrification level of 10 ppm of ammonia in the borrow pit had been aimed at. Both pond 1 and pond 2 had an entrance ammonia level of 350 ppm and a flowrate of 200 gpm. A nitrification level of ammonia of 25 ppm in pond 1 and pond 2 had been goaled for. Four to seven parts of m-alkalinity are required to remove every part of ammonia. In the borrow pit, pond 1 and pond 2, a bicarbonate m-alkalinity of above 100 ppm, a soluble ortho-phosphate level at or above 2 ppm, a pH of between 7.0 and 8.5 and a dissolved oxygen level (DO) of over 1.0 were maintained at all times. Although 30,000 pounds of sodium bicarbonate had to be added to the borrow pit to maintain the baseline of 100 ppm m-alkalinity in the borrow pit, 10,000 pounds were originally added. To provide an electron donor to start nitrification in areas of low DO, potassium nitrate was added, with 500 lbs being added on day 5, 1000 lbs added on day 8 and 500 lbs added on day 15. The m-alkalinity and the phosphate levels were monitored every other day to ensure the stability of the m-alkalinity and of the phosphate (which is used to feed bacterial growth levels). Meanwhile, the BOD level was increased to 5 ppm by using corn syrup, with 500 pounds of corn syrup required for the 5 ppm increase in BOD level.

A cascade was dammed and three water cannons were used to recirculate water in the corner of the pit to provide more oxygen. The fourth discharge point in the distribution ring was utilized to feed the waterfall for nutrient/bacterial feeding and recirculation back into the corner of the borrow pit. The residence time in pond 1 and in pond 2 was aimed to be kept at or above 5 days. Testings were performed to determine ammonia, nitrate, nitrite, m-alkalinity and phosphate levels. With a residence time of about 2.5 days existing within the borrow pit, nearly 110 ppm of ammonia entered the borrow pit via pond 1 and pond 2. The development of a residence time constraint due to flow fluctuations in pond 1 and pond 2 resulted in discontinuation of augmentation in pond 1, pond 2 and the borrow pit. Thus, 5 days of residence time in pond 1 and pond 2, along with 7 days of residence time in the system were aimed at. However, all operations in relation to pond 1 were continued in order to maintain the ammonia discharge to the borrow pit near or less than 100 ppm. Due to existence of flow fluctuations in pond 1, pond 1 was reinoculated. Also, one aerator was moved from pond 2 to pond 1 to minimize channeling in pond 1, with 3 aerators positioned in pond 1, one located approximately 50 feet from each corner of pond 1. The testings were performed during the 5-day inoculation programs and three times a week thereafter in an attempt to reach an ammonia level of below 20 ppm in the borrow pit.

Approximately 5 days of residence time in pond 1 and pond 2 and 70 gpm throughput were measured. The inlet COD was near 60 in pond 2. The borrow pit was able to make a 65 percent reduction in the ammonia level (from 110 to 40 ppm) with 4 days of residence time while recycling 2,000 gpm of 40 ppm ammonia.

A significant amount of toxic inhibition for nitrification from the COD of the wastewater had prohibited expected results in pond 1. The toxic material had been determined, through numerous tests, to be a derivative of aniline.

Most successful configurations of Test 1 were:

A. Plant runoff and scrubber blowdown entered pond 1 and traversed pond 2, accompanied by 100 gpm of recycle from the exit of pond 2 that was pumped back to the center of pond 1. An average inlet ammonia concentration near 170 ppm and a residence time near 5 days resulted in an irregular reduction of approximately 60 percent and a regular reduction of approximately 40 percent in the ammonia level.

B. Pond 1 and pond 2 were functioning in series. A significant nitrate production solely exiting pond 2 at near 18 ppm for 5 days resulted.

A 150 gpm recycle pump was installed to recycle wastewater from the exit of pond 2 to the center of pond 1, but neither nitrification nor any degree of nitrate or nitrite production was achieved. Sufficient sludge age could not exist simultaneously with corresponding physical constraints present around pond 1 and pond 2.

Economical nitrification in pond 1 and in pond 2 was not achieved. No positive results could be reached by the biotreatment process of the effluent wastewater streams by solely using nitrification.

EXAMPLE 2

Upon performance and revision of numerous tests, it was concluded that high levels of sulfides in combination with aniline present in the wastewater could be responsible for inhibiting nitrification. Thus, the wastewater was treated by aiming at removing sulfides and aniline before undergoing nitrification. COD, TKN, aniline and sulfides were removed from the waste gas scrubbing system effluent water utilizing a mixture of heterotrophs and Thiobacillus. Acclimation of the heterotrophs was accomplished with a biological acclimation and enrichment reactor. The reactors reduced mycell toxicity to the heterotrophs so that the heterotrophs performed more efficiently and effectively. To control pH of the heterotrophic reaction with inorganic and organic sulfides, magnesium oxide was utilized.

Hydrogen sulfide reacted with the "S" cultures, along with relatively low levels of available oxygen, to generate sulfur and water. Metabolic energy for the "S" cultures resulted from the reaction. The "S" cultures oxidized the sulfur compounds to elemental sulfur.

With adequate removal of the aniline, sulfides, COD, TKN and BOD, ammonia, that was either present from the waste gas scrubbing system or was produced from the biological breakdown of TKN, was removed by nitrosomonas and nitrobacters. Enrichment of the nitrosomonas and nitrobacters was accomplished with a biological enrichment reactor. To control pH and provide a carbon source for the nitrosomonas and nitrobacters, a combination of magnesium oxide and sodium bicarbonate was utilized. To provide a source of soluble O-Phosphate, mono-calcium phosphate was utilized.

Several tests have been performed on the updated version of the biotreatment process. The wastewater from the scrubbing tower was blown down into pond 4 and, then, collected in pond 3. A sulfidic species existed in the wastewater from the scrubbing tower blowdown. Pond 3 was treated separately and prior to nitrification. Two aerators were installed in pond 3 to reduce the COD, with only one aerator required when the COD was under control and when the COD was maintained at less than 2,000 ppm.

Enricher reactor acclimated the wetted bacteria cultures to the relatively toxic environment of pond 3. Wastewater in pond 3 was treated with the wetted bacterial cultures. In addition to using bacterial cultures, the wastewater was treated in pond 3 with a number of enricher reactors.

The wastewater from pond 3 was directed to pond 1, joining wastewater from the cooling tower blowdown and from the borrow pit recycle. A number of aerators were installed in pond 1. Pond 1 comprises: "S" cultures which oxidize sulfide compounds to elemental sulfur, the wetted bacterial cultures that are also available in pond 3, adapted microorganisms and growth stimulants and nitrifying microorganisms. While having the ability to grow under reduced oxygen conditions, the "S" cultures prevent oxidation of sulfur to sulfuric acid.

The adapted heterotrophic microorganisms and growth stimulants have a specific gravity ranging from approximately 0.5 to 0.7 and are used to treat wastes with a strong organic content and high amine (aniline), BOD and/or COD. Said wastes may contain various levels of biologically resistant quasi-toxic and toxic compounds that interfere with the normal operations of wastewater treatment systems. The adapted heterotrophic microorganisms are cultured on aminic species. Biomass enhancement with the adapted heterotrophic microorganisms and growth stimulants enable the treatment system to degrade organic wastes that contain complex organics, such as phenols, benzenes, aliphatic and aromatic hydrocarbons, methacrylates, nitriles, creosols, naphthalenes, amines, organic alcohols, synthetic detergents and surfactants, gasoline, kerosene, fuel and machine oils, formaldehyde, glycols, heterocyclics including morpholine and pyridine, ethoxylated phenols, waxes and other difficult to treat compounds. Cyanides are biologically removed from the solution with the biomass. For optimal results, the adapted heterotrophic microorganisms and growth stimulants should be dispersed one part in eight to ten parts of water (i.e. about one pound per gallon) having a temperature of about 80° F. to about 100° F. The solution should be maintained for at least one hour while being aerated. The wastewater treatment system should meet the following conditions for the adapted microorganisms and growth stimulants to achieve optimal results:

|  | OPTIMUM | MINIMUM | MAXIMUM |
| --- | --- | --- | --- |
| Influent pH | 7.0 | 6.0 | 9.0 |
| Dissolved oxygen (ppm) | 2.0+ | 1.0 | — |
| C/N/P ratio | 100/10/1 | 100/5/1 | 100/20/1 |
| Temperature (°C.) | 30 (86° F.) | 10 (50° F.) | 40 (104° F.) |
| Toxic metals (e.g. hex. chromium, copper, zinc) (ppm) | 0 | 0 | 2 |

The nitrifying microorganisms were in the form of a gel. The gel of nitrifying microorganisms is used for biochemical oxidizing of ammonia in biological treatment plants. The gel is a blend of nitrosomonas and nitrobacters and contains no preservatives. Toxic organic compounds, variable pH and high and low wastewater temperatures tend to inhibit the activity of and to poison, nitrifying microorganisms. For regeneration, nitrifying microorganisms need extended periods of time during which ammonia removal is delayed. The nitrifying microorganisms enable and enhance nitrification during the period when nitrification will not or cannot occur. Thus, nitrifying microorganisms assist in commencement and/or reseeding of nitrification systems and provide ammonia oxidation in systems of marginal sludge age and/or under adverse biochemical conditions. The gel must be refrigerated (at 4° C.±2° C.) before usage.

Optimal results are accomplished by applying one hour pre-aeration and pre-hydration at a ratio of one unit per gallon of clean non-chlorinated water. For optimal results, the wastewater treatment system should have the following specifications:

|  | OPTIMUM | MINIMUM | MAXIMUM |
| --- | --- | --- | --- |
| Influent pH | 7.8 | 6.5 | 8.5 |
| Dissolved oxygen (ppm) | 2.0+ | 1.0 | — |
| C/N/P ratio | 100/10/1 | 100/5/1 | 100/20/1 |
| Temperature (°C.) | 30 (86° F.) | 10 (50° F.) | 40 (104° F.) |
| Toxic metals (e.g. hex. chromium, copper, zinc) (ppm) | 0 | 0 | 1.0 |

Without application of Bio 1000 or "S" cultures, the application of the nitrifying microorganisms presented the following results:

|  | Standard | Pond 1 | Pond 2 | Borrow Pit West | Borrow Pit Pump Area |
| --- | --- | --- | --- | --- | --- |
| Beginning $NH_4OH$ | 200 ppm | 130 ppm | 160 ppm | 120 ppm | 130 ppm |
| Ending $NH_4OH$ | 150 ppm | 110 ppm | 125 ppm | 85 ppm | 90 ppm |
| Removal (in 2 hours) | 50 ppm | 20 ppm | 35 ppm | 35 ppm | 45 ppm |
| % Inhibition | 0 (QC std.) | 40% | 30% | 30% | 10% |

At full strength, the nitrifying microorganisms presented 75 to 85 percent inhibition. At 20 to 25 percent concentration, the nitrifying microorganisms presented 0 percent inhibition.

To maximize the efficiency of building a bacterial population, recycle loops were maintained. The wastewater exiting pond 1 went through two continuous recycles. A portion of the wastewater exiting pond 1 was directly recycled back to pond 1, without passing through any other wastewater source. The other portion of the wastewater exiting pond 1 entered and was treated in pond 2. Some of the wastewater leaving pond 2 was recycled back to pond 1. Two aerators were installed in pond 2. The nitrifying microorganisms that were used in pond 1 transversed to pond 2. The remaining amount of wastewater exiting pond 2 moved through and was joined in the cascade ditch by some plant runoff and, then, by wastewater from the plant heat exchangers running through the cooling ditch before entering the borrow pit. The "S" cultures and the nitrifying microorganisms were components of the borrow pit. A number of enricher reactors of nitrifiers were charged to the borrow pit. The most preferred embodiment for maximal nitrification by the biotreatment process requires maintaining an m-alkalinity of above 100 ppm, a pH of 7.5±0.25, a phosphate level of above 3 ppm and sufficient enricher reactors of nitrifiers to be capable of achieving the desired results. The wastewater exiting the borrow pit underwent direct continuous recycle through various routes. A portion of one of said recycle routes was directed towards the plant heat exchangers and another portion was recycled back to pond 1.

Test 1

The description of this test of Example 2 is more oriented towards specifying the different stages, the relationship of the stages and the relationship of the measurements of the different stages. The measurements are not accurately specified and should be considered solely as estimates.

On day 1, the test started with a pH of about 8 and a nitrate level of 22±5 ppm in the exit stream of pond 1 (which had a volume of about 400,000 gallons) and pond 2 (which had a volume of about 400,000 gallons). The exit stream of the borrow pit had a pH of about 7.7 and a nitrate level of about 70. The m-alkalinity of the exit stream of pond 2 was only 12 ppm, while the m-alkalinity of the exit stream of pond 1 and of the borrow pit was 160 ppm. The phosphate level of the exit stream of pond 1 and pond 2 was 4.5 ppm and of the exit stream of the borrow pit was 5.0 ppm. The ammonia-nitrogen level of pond 1 and pond 2 was about 165 ppm and 170 ppm, respectively, and of the exit stream of the borrow pit was 110 ppm.

On day 36, sodium bicarbonate was added to pond 1 while nitrate levels were maintained in pond 1, pond 2 and the borrow pit, resulting in an increase in alkalinity of exiting stream of pond 1 from 40 ppm to 184 ppm and in pH from 7.23 to 8.05 (under pH control by magnesium oxide). Due to an increase in COD in the borrow pit, 15 lbs of COD bacteria were added to pond 1 and 10 lbs of COD bacteria were added to pond 2, attempting to reduce the COD to less than 300 in order to take the COD load off the borrow pit and the nitrifiers.

On day 39, the "S" cultures were added to pond 1 which had a pH of 7.8. Sodium bicarbonate (amount) was added to the borrow pit. (Pond 1 also comprised the adapted microorganisms and growth stimulants, the nitrifying microorganisms and wetted bacterial cultures, while pond 2 and the borrow pit comprised the nitrifying microorganisms.) The alkalinity of exit streams of pond 1 and pond 2 increased to over 300 ppm (i.e. above the goal of 100 ppm).

On day 44, there was a noticeable decrease (in comparison to day 39) in the nitrate level of the exit stream of pond 1, pond 2 and the borrow pit (from 264 ppm to 160 ppm), with a larger decrease occurring in the nitrate level of the exit stream of pond 2 versus the exit stream of pond 1 (from 132 ppm to 14 ppm and to 44 ppm, respectively). On day 45, there was an even further decrease in the nitrate level of the exit stream of pond 1, pond 2 and the borrow pit, with the nitrate level of the exit stream of pond 2 decreasing to zero.

Test 2

This test of Example 2 concentrates on changes in the types of components that are applied, rather than measurements.

On day 1, the test started with a pH of approximately 7.5, an m-alkalinity of 100 ppm, a nitrate level of 70.4 ppm, a phosphate level of 3 ppm and an ammonia-nitrogen level of 190 ppm in the exit stream of pond 1 and pond 2. The exit stream of the borrow pit had an m-alkalinity of 120 ppm, a nitrate level of 211.2, a phosphate level of 5 ppm, an ammonia-nitrogen level of 80 ppm and a pH of about 7.3. The inlet stream of pond 1 had a pH of about 7.3, an m-alkalinity of 90 ppm and an ammonia-nitrogen level of 160 ppm.

On day 2, sodium bicarbonate, "S" cultures and heterotrophs were added to pond 1. Nitrifying microorganisms were added to pond 1, pond 2 and the borrow pit.

On day 7, sodium carbonate was added to the borrow pit and an enricher reactor was added. On day 8 and day 9, enricher reactors of nitrifiers were added to the borrow pit. Sodium bicarbonate and nitrifiers were added to pond 1 and to pond 2. COD and "S" cultures were added to pond 1.

On day 10, a decision was made to maintain the pH of the cooling tower blowdown. The cooling tower blowdown to pond 1 was at a pH of 5.3, requiring the movement of the borrow pit recycle line to a different position of pond 1 in order to improve residence time. On day 14, COD, "S" cultures, nitrifiers and sodium bicarbonate were added as on days 8 and 9. In addition, phosphate was added to pond 1 and cooling tower blowdown was at a pH of 6.5.

On day 14, phosphate was added to pond 1. In pond 1, m-alkalinity was maintained by using sodium bicarbonate and pH was maintained by using magnesium oxide. Pond 1 continued to be augmented with COD and "S" cultures. Pond 1, pond 2 and the borrow pit were continued to be augmented by using nitrifiers. The pH of the cooling tower blowdown was maintained at 6 or above. Nitrate levels in pond 1 and in pond 2 had raised. The nitrate levels of the borrow pit recycles have also increased.

On day 15, COD control was lost.

On day 18, the results of the tests implied the existence of a toxic component in pond 1 and in pond 2 that prevented nitrification. Daily testings were performed to delete the prevention of nitrification.

Test 3

This test presents the description and results of the biotreatment process presented in Example 2. The following description is based upon results obtained within a short period of operation of the system.

The wastewater from the scrubbing tower was blown down at a rate of 5 gpm into pond 4 and, then, collected in pond 3. The cooling tower blowdown was maintained at a pH of 6 or above. The culprit inhibiting nitrification is a sulfidic species that existed in the wastewater from the scrubbing tower blowdown. Pond 3 was treated separately and prior to nitrification. Wastewater in pond 3 was treated with wetted bacterial cultures. In addition to using wetted bacterial cultures, the wastewater was treated in pond 3 with an enricher reactor. There was no increase of ammonia off the wastewater of pond 3, implying a minimal TKN component (the ammonia was as low as 2 ppm). However, a minimal residual ammonia of at least 1 ppm was maintained continuously since the COD bacteria utilize ammonia as a building block.

The wastewater from pond 3 was directed to pond 1, joining wastewater from the cooling tower blowdown and from the borrow pit recycle. Pond 1 was augmented with the adapted microorganisms and growth stimulants.

The plant bypass was tamed around pond 1 and pond 2. The wastewater from the cooling tower blowdown was directed towards pond 1 at a rate of approximately 30 gpm to 75 gpm. The cooling tower blowdown comprised 548 mg/l of ammonia-nitrogen, 217 mg/l of sulfide and a COD of 670 mg/l.

The effluent from the borrow pit was recycled to pond 1 at 100 gpm. Two 15-HP aerators were installed in pond 1. Except for 250 gpm of wastewater that was recycled directly back to pond 1, the remaining exiting wastewater from pond 1 was directed to pond 2. Meanwhile, 150 gpm of wastewater that was sent from pond 2 back to pond 1. The wastewater exiting pond 1 comprised 103 mg/L of ammonia-nitrogen and 260 mg/L of COD.

Two 15-HP aerators were installed in pond 2. Any amount of wastewater exiting pond 2 that was not recycled to pond 1 moved through and was joined in the cascade ditch by some plant runoff and, then, by wastewater from the plant heat exchangers. The wastewater from the plant heat exchangers, at 2,500 gpm, moved through the cooling ditch before entering the cascade ditch. The wastewater exiting the borrow pit underwent direct continuous recycle through various routes.

The wastewater leaving pond 2 comprised 86.5 mg/L of ammonia-nitrogen and 230 mg/L of COD.

The wastewater from the cascade ditch, which was a combination of the plant runoff, 2500 gpm of wastewater from the plant heat exchangers and a stream of wastewater exiting pond 2, entered the borrow pit of 20,000,000 gallons. The nitrifying microorganisms were used to augment pond 1, pond 2 and the borrow pit. The wastewater of the borrow pit comprised 13.4 mg/L of ammonia-nitrogen and 110 mg/L of COD.

Following a similar process, other tests were run. Some results of the different parts of the process are indicated in the following tables. The data of the following tables of Example 2 were collected at sample locations for simultaneous operation of the different sections of the biotreatment process of the wastewater. The following tables indicate decreases in the levels of sulfides during the biotreatment process and include essential data of the present invention. The cooling tower blowdown includes essentially the highest levels of sulfides in the biotreatment process. However, the levels of sulfides of the wastewater stream leaving pond 1 are negligible.

Test 4

The sulfide level dropped from 217.6 mg/L at the exit from the cooling tower blowdown to a level of less than 1.0 mg/L when leaving pond 1, pond 2 and the borrow pit, resulting in spike percent recovery of 99.3% for the sulfide.

| SAMPLE LOCATION | COD (mg/L) | SULFIDE (mg/L) | AMMONIA-NITROGEN (mg/L) |
|---|---|---|---|
| Pond 1 Out | 393.0 | <1.0 | 98.8 |
| Pond 2 Out | 367.0 | <1.0 | 96.3 |
| Borrow Pit | 63.0 | <1.0 | 40.0 |
| CT Blowdown | 597.0 | 217.6 | 329.8 |

| | COD | SULFIDE | AMMONIA-NITROGEN |
|---|---|---|---|
| DUP 1 (mg/L) | 43.0 | 217.6 | 40.0 |
| DUP 2 (mg/L) | 41.0 | 217.8 | 40.3 |
| SPIKE % REC | 95.0 | 99.3 | 98.0 |

Test 5

The level of sulfide dropped from 228.1 mg/L, as measured in the wastewater leaving the cooling tower, to less than 1.0 mg/L at the exit of pond 1. There was a spike percent recovery of 96.5 in the sulfide level.

| SAMPLE LOCATION | COD (mg/L) | SULFIDE (mg/L) | AMMONIA-NITROGEN (mg/L) |
|---|---|---|---|
| Pond 1 Out | 357.0 | <1.0 | 132.7 |
| Pond 2 Out | 282.0 | — | 108.9 |
| Borrow Pit | — | — | 9.5 |
| CT Blowdown | 2,446.0 | 228.1 | 559.7 |

| | COD | SULFIDE | AMMONIA-NITROGEN |
|---|---|---|---|
| DUP 1 (mg/L) | 357.0 | 228.1 | 9.5 |
| DUP 2 (mg/L) | 360.0 | 227.7 | 9.7 |
| SPIKE % REC | 102.3 | 96.5 | 95.2 |

Test 6

A significant reduction in COD, TOC and levels of sulfide, ammonia-nitrogen and cyanide present the effectiveness of the improved biotreatment process.

| SAMPLE LOCATION | COD (mg/L) | SULFIDE (mg/L) | AMMONIA-NITROGEN (mg/L) | Cyanide (mg/L) | TOC (mg/L) |
|---|---|---|---|---|---|
| Pond 1 Out | 272.0 | <1.0 | 20.4 | — | 23.9 |
| Pond 2 Out | 196.0 | — | 19.0 | — | 24.1 |
| CT Blowdown | 346.0 | 104.8 | 166.3 | — | 53.3 |
| Pond 3 | 6150.0 | — | 6.4 | 3.36 | 945.0 |
| Pond 4 | 8630.0 | — | 23.0 | | 792.6 |

| | COD | SULFIDE | AMMONIA-NITROGEN | CYANIDE | TOC |
|---|---|---|---|---|---|
| DUP 1 (mg/L) | 54.0 | <1.0 | 20.4 | 0.16 | 23.9 |
| DUP 2 (mg/L) | 52.0 | <1.0 | 20.7 | 0.16 | 24.4 |
| SPIKE % REC | 99.0 | 100.0 | 95.0 | 92.3 | 97.3 |

EXAMPLE 3

Based upon completion and revision of several tests, it is determined that blends of "S" cultures are capable of allowing nitrification to occur in absence of nitrifiers. During the tests, the goal of the treatment of the wastewater was the achievement of nitrification, in the absence of nitrifiers, by applying co-cultures of the bacteria with various heterotrophs to the wastewater. BOD, TKN, sulfides and ammonia of the wastewater were minimized utilizing blends of "S" cultures.

Test 1

"S" cultures were blended in concentrations of 20% or more with various heterotrophs to form co-cultures which were capable of minimizing sulfide content and to allow nitrification to occur, without application of any nitrifiers.

BOD removal and nitrification of a 45-acre pond system, with an input of 3 million gallons of wastewater per day, were aimed at. The level of sulfides in the wastewater was so high that nitrification was stopped. The level of sulfates in the sludge of the bottom of the pond was over 10,000 lbs/million. Dissolved oxygen had reduced to non-detectable levels in parts of the system. Five tons of sodium nitrate and one hundred pounds (100 lbs) of the co-cultures of the "S" cultures with various heterotrophs were added to the wastewater. Sodium nitrate was added to provide anoxic conditions for the "S" cultures. The co-cultures comprised "S"-culture concentrations of at least 20%. Within five days, the ammonia level dropped from 30 ppm to 4 ppm. No nitrifiers were used or required in the process. Nitrification was performed by nitrifiers that were originally present in the system.

Whether nitrification is performed by nitrifiers or by co-cultures of the bacteria with various heterotrophs, a nitrate source is capable of serving as an electron donor to commence operation. The nitrate source creates an anoxic region where the bacteria start to operate. Where nitrifiers are used, the nitrate source also triggers nitrifiers to commence operation.

Certain objects are set forth above and made apparent from the foregoing description, drawings and examples. However, since certain changes may be made in the above description, drawings and examples without departing from the scope of the invention, it is intended that all matters contained in the foregoing description, drawings and examples shall be interpreted as illustrative only of the principles of the invention and not in a limiting sense. With respect to the above description and examples then, it is to be realized that any descriptions, drawings and examples deemed readily apparent and obvious to one skilled in the art and all equivalent relationships to those stated in the examples and described in the specification or illustrated in the drawings are intended to be encompassed by the present invention.

Further, since numerous modifications and changes will readily occur to those skilled in the art, it is not desired to limit the invention to the exact construction and operation shown and described, and accordingly, all suitable modifications and equivalents may be resorted to, falling within the scope of the invention. It is also to be understood that the following claims are intended to cover all of the generic and specific features of the invention herein described, and all statements of the scope of the invention which, as a matter of language, might be said to fall in between.

What is claimed as invention is:

1. A process for biologically treating wastewater, containing sulfides, biological oxygen demand, chemical oxygen demand and ammonia, said process comprising:
   (a) applying bacteria cultures to the wastewater to minimize sulfide content of the wastewater, while simultaneously applying co-cultures of the bacteria with various heterotrophs to the wastewater in order to minimize chemical oxygen demand, biological oxygen demand and total Kjeldahl nitrogen of the wastewater; and
   (b) applying nitrifying bacteria cultures to the wastewater to enhance nitrification and to minimize ammonia content of the wastewater.

2. The process for biologically treating wastewater according to claim 1, wherein sulfide is converted to sulfate in an aerobic reaction by sulfur-oxidizing bacteria cultures, with sulfur being used as a source of energy and with the bacteria being cultured on sulfides.

3. The process for biologically treating wastewater according to claim 2, wherein sulfide is converted to sulfate in an anoxic reaction.

4. The process for biologically treating wastewater according to claim 1, wherein the bacteria cultures are of the genus Thiobacillus.

5. The process for biologically treating wastewater according to claim 4, wherein the Thiobacillus are cultured on thio-sulfides.

6. The process for biologically treating wastewater according to claim 1, wherein the bacteria used for co-culture with various heterotrophs comprise approximately 40% of a species of sulfur-degrading cultures and approximately 60% of cultures raised on thio-sulfides.

7. The process for biologically treating wastewater according to claim 1, wherein the bacteria used for co-culture with various heterotrophs comprise up to 100% of a species of sulfur-degrading bacteria which are referred to as "S" cultures and which are raised on thio-sulfides.

8. The process for biologically treating wastewater according to claim 1, wherein the co-cultures of the bacteria with the heterotrophs are raised on thio-sulfates and are capable of growing under even reduced oxygen levels.

9. The process for biologically treating wastewater according to claim 1, wherein the co-cultures of the bacteria with the heterotrophs, despite being aerobes, obtain energy at interfaces of anaerobic environments by absorbing and detoxifying hydrogen sulfide, generating sulfur and water while preventing oxidization of sulfur to sulfuric acid.

10. The process for biologically treating wastewater according to claim 1, wherein the co-cultures of bacteria with various heterotrophs are acclimated to the species to be removed by using a number of biological acclimation and enrichment reactors that are needed for reducing mycell toxicity to and increasing effectiveness of the bacteria and of the heterotrophs.

11. The process for biologically treating wastewater according to claim 10, wherein an additive comprising ammonia is provided to the number of biological acclimation and enrichment reactors for feeding the heterotrophs.

12. The process for biologically treating wastewater according to claim 1, wherein magnesium oxide, caustic or a combination of magnesium oxide and caustic is used to control pH of the sulfides during application of co-cultures of bacteria with various heterotrophs to the wastewater.

13. The process for biologically treating wastewater according to claim 1, wherein the heterotrophs are cultured on aminic species.

14. The process for biologically treating wastewater according to claim 1, wherein the nitrifying bacteria cultures comprise nitrosomonas, which aerobically convert ammonia to nitrite, and nitrobacters, which aerobically convert nitrite to nitrate.

15. The process for biologically treating wastewater according to claim 1, wherein the nitrifying bacteria cultures are acclimated to the species to be removed by using a number of biological acclimation and enrichment reactors that are needed for increasing the population size and population effectiveness of the nitrifying bacteria cultures.

16. The process for biologically treating wastewater according to claim 15, wherein an additive comprising ammonia is provided to the number of biological acclimation and enrichment reactors for feeding the heterotrophs.

17. The process for biologically treating wastewater according to claim 1, wherein a combination of magnesium oxide and sodium bicarbonate is used to control pH of the wastewater and to provide a carbon source for the nitrifying bacteria cultures during nitrification.

18. The process for biologically treating wastewater according to claim 1, wherein an additive comprising phosphate is added to the wastewater as a source of water-soluble phosphates.

19. The process for biologically treating wastewater according to claim 1, wherein an additive comprising monocalcium phosphate is applied as a source of soluble o-phosphate.

20. The process for biologically treating wastewater according to claim 1, wherein ammonia is provided to the bacteria cultures by the breakdown of total Kjeldahl nitrogen.

21. The process for biologically treating wastewater according to claim 1, wherein the wastewater to be treated is from waste gas scrubbing systems of hydrocarbon processing facilities.

22. The process for biologically treating wastewater according to claim 1, wherein a nitrate source, serving as an electron donor, triggers the bacteria cultures to commence operation.

23. A process for biologically treating wastewater, containing sulfides, chemical oxygen demand, biological oxygen demand and ammonia, said process comprising:

applying bacteria cultures to the wastewater to minimize sulfide content of the wastewater, while simultaneously applying co-cultures of the bacteria with various heterotrophs to the wastewater in order to minimize chemical oxygen demand, biological oxygen demand, total Kjeldahl nitrogen and ammonia content of the wastewater and to enhance nitrification.

24. The process for biologically treating wastewater according to claim 23, wherein the co-cultures comprise at least 20% of a species of sulfur-degrading bacteria which are referred to as "S" cultures.

25. The process for biologically treating wastewater according to claim 23, wherein sulfide is converted to sulfate in an aerobic reaction by sulfur-oxidizing bacteria cultures, with sulfur being used as a source of energy and with the bacteria being cultured on sulfides.

26. The process for biologically treating wastewater according to claim 25, wherein sulfide is converted to sulfate in an anoxic reaction.

27. The process for biologically treating wastewater according to claim 23, wherein the bacteria cultures are of the genus Thiobacillus.

28. The process for biologically treating wastewater according to claim 27, wherein the Thiobacillus are cultured on thio-sulfides.

29. The process for biologically treating wastewater according to claim 23, wherein the bacteria used for co-culture with various heterotrophs comprise approximately 40% of a species of sulfur-degrading cultures and approximately 60% of cultures raised on thio-sulfides.

30. The process for biologically treating wastewater according to claim 23, wherein the bacteria used for co-culture with various heterotrophs comprise up to 100% of a species of sulfur-degrading bacteria which are referred to as "S" cultures and which are raised on thio-sulfides.

31. The process for biologically treating wastewater according to claim 23, wherein the co-cultures of the bacteria with the heterotrophs are raised on thio-sulfates and are capable of growing under even reduced oxygen levels.

32. The process for biologically treating wastewater according to claim 23, wherein the co-cultures of the bacteria with the heterotrophs, despite being aerobes, obtain energy at interfaces of anaerobic environments by absorbing and detoxifying hydrogen sulfide, generating sulfur and water while preventing oxidization of sulfur to sulfuric acid.

33. The process for biologically treating wastewater according to claim 23, wherein the heterotrophs are cultured on aminic species.

34. The process for biologically treating wastewater according to claim 23, wherein ammonia is provided to the bacteria cultures by the breakdown of total Kjeldahl nitrogen.

35. The process for biologically treating wastewater according to claim 23, wherein a nitrate source, serving as an electron donor, triggers the bacteria cultures to commence operation.

* * * * *